US010124287B2

(12) United States Patent
Tanaka et al.

(10) Patent No.: US 10,124,287 B2
(45) Date of Patent: Nov. 13, 2018

(54) GAS CONCENTRATION METHOD

(71) Applicant: Osaka Gas Co., Ltd., Osaka-shi (JP)

(72) Inventors: Hiroshi Tanaka, Osaka (JP); Yukio Fujiwara, Osaka (JP); Tamotsu Kotani, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 111 days.

(21) Appl. No.: 15/321,814

(22) PCT Filed: Jun. 26, 2015

(86) PCT No.: PCT/JP2015/068534
§ 371 (c)(1),
(2) Date: Dec. 23, 2016

(87) PCT Pub. No.: WO2015/199227
PCT Pub. Date: Dec. 30, 2015

(65) Prior Publication Data
US 2017/0144101 A1 May 25, 2017

(30) Foreign Application Priority Data

Jun. 27, 2014 (JP) .................................. 2014-133150

(51) Int. Cl.
*B01D 53/047* (2006.01)
*C10L 3/10* (2006.01)
(52) U.S. Cl.
CPC ............ *B01D 53/047* (2013.01); *C10L 3/104* (2013.01); *C10L 3/105* (2013.01);
(Continued)

(58) Field of Classification Search
CPC ............ B01D 53/047; B01D 2253/102; B01D 2253/116; B01D 2256/245;
(Continued)

(56) References Cited

U.S. PATENT DOCUMENTS 6,007,606 A * 12/1999 Baksh .................. B01D 53/053
95/101
7,763,100 B2 * 7/2010 Baksh ................ B01D 53/0476
95/100
(Continued)

FOREIGN PATENT DOCUMENTS

CN 102861499 A 1/2013
JP 58198591 A 11/1983
(Continued)

*Primary Examiner* — Frank M Lawrence, Jr.
(74) *Attorney, Agent, or Firm* — The Webb Law Firm

(57) ABSTRACT

Provided herein is a method for improving a gas recovery rate during generation of a high-purity gas. The method includes providing three or more adsorption towers filled with an adsorbent that adsorbs an adsorption target gas. Performing a pressure lowering equalization process in a first adsorption tower in which an adsorption process has been finished, and in a source gas supply state in which a source gas is supplied to at least a second adsorption tower in which a pressure increasing equalization process has been finished and the adsorption process is to be subsequently performed; and transferring a non-adsorbed gas from an upper portion of the first adsorption tower to the upper portion of the second adsorption tower, thereby performing an adsorption and pressure lowering equalization process in the first adsorption tower and an adsorption and pressure increasing equalization process in the second adsorption tower.

6 Claims, 4 Drawing Sheets

(52) U.S. Cl.
CPC .. *B01D 2253/102* (2013.01); *B01D 2253/116* (2013.01); *B01D 2256/245* (2013.01); *B01D 2259/403* (2013.01); *B01D 2259/404* (2013.01); *B01D 2259/4006* (2013.01); *B01D 2259/40039* (2013.01); *B01D 2259/40041* (2013.01); *B01D 2259/40062* (2013.01); *C10L 2290/542* (2013.01)

(58) Field of Classification Search
CPC ........... B01D 2259/40039; B01D 2259/40041; B01D 2259/4006; B01D 2259/40062; B01D 2259/403; B01D 2259/404; C10L 3/104; C10L 3/105; C10L 2290/542

USPC ............................................ 95/96, 103, 148

See application file for complete search history.

(56) References Cited

U.S. PATENT DOCUMENTS

| | | | |
|---|---|---|---|
| 2002/0014153 | A1 | 2/2002 | Baksh et al. |
| 2005/0257685 | A1 | 11/2005 | Baksh et al. |
| 2007/0095208 | A1* | 5/2007 | Baksh ................ B01D 53/047 95/96 |
| 2010/0083697 | A1 | 4/2010 | Degenstein et al. |
| 2013/0042754 | A1 | 2/2013 | Lomax et al. |
| 2015/0007724 | A1 | 1/2015 | Sakamoto et al. |
| 2016/0272908 | A1* | 9/2016 | Utaki ...................... B01J 20/20 |

FOREIGN PATENT DOCUMENTS

| | | |
|---|---|---|
| JP | 2001187309 A | 7/2001 |
| JP | 2007537867 A | 12/2007 |
| JP | 2008246403 A | 10/2008 |
| JP | 2012503543 A | 2/2012 |
| JP | 2013528486 A | 7/2013 |
| JP | 2013155076 A | 8/2013 |

* cited by examiner

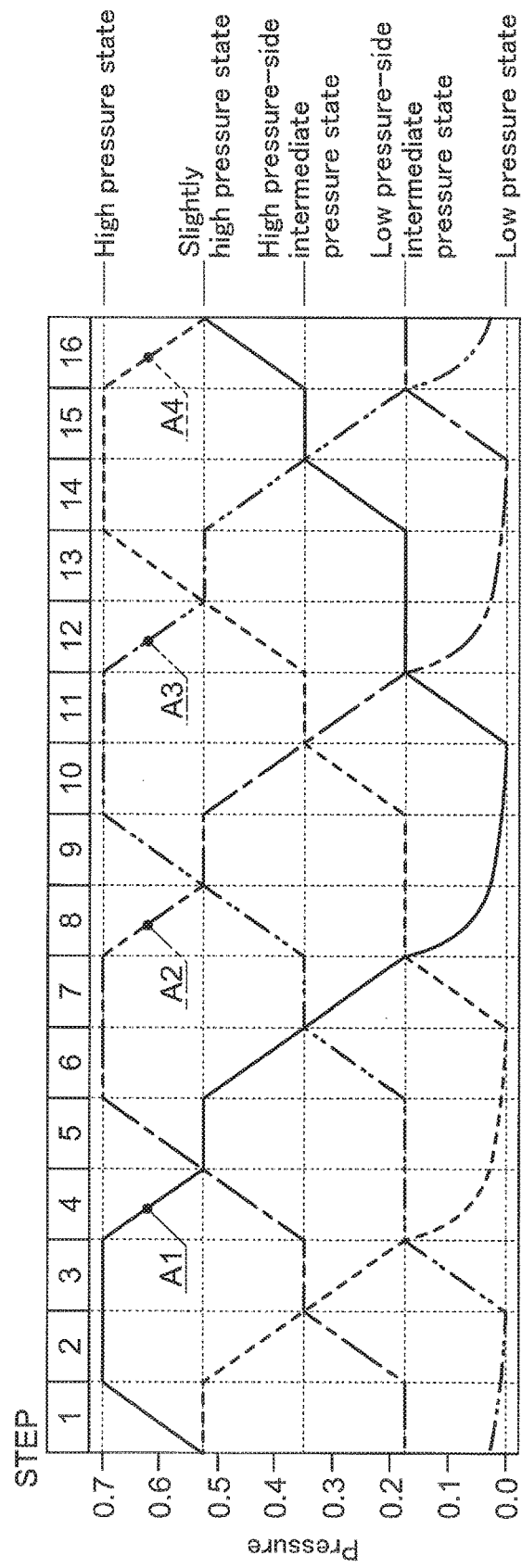

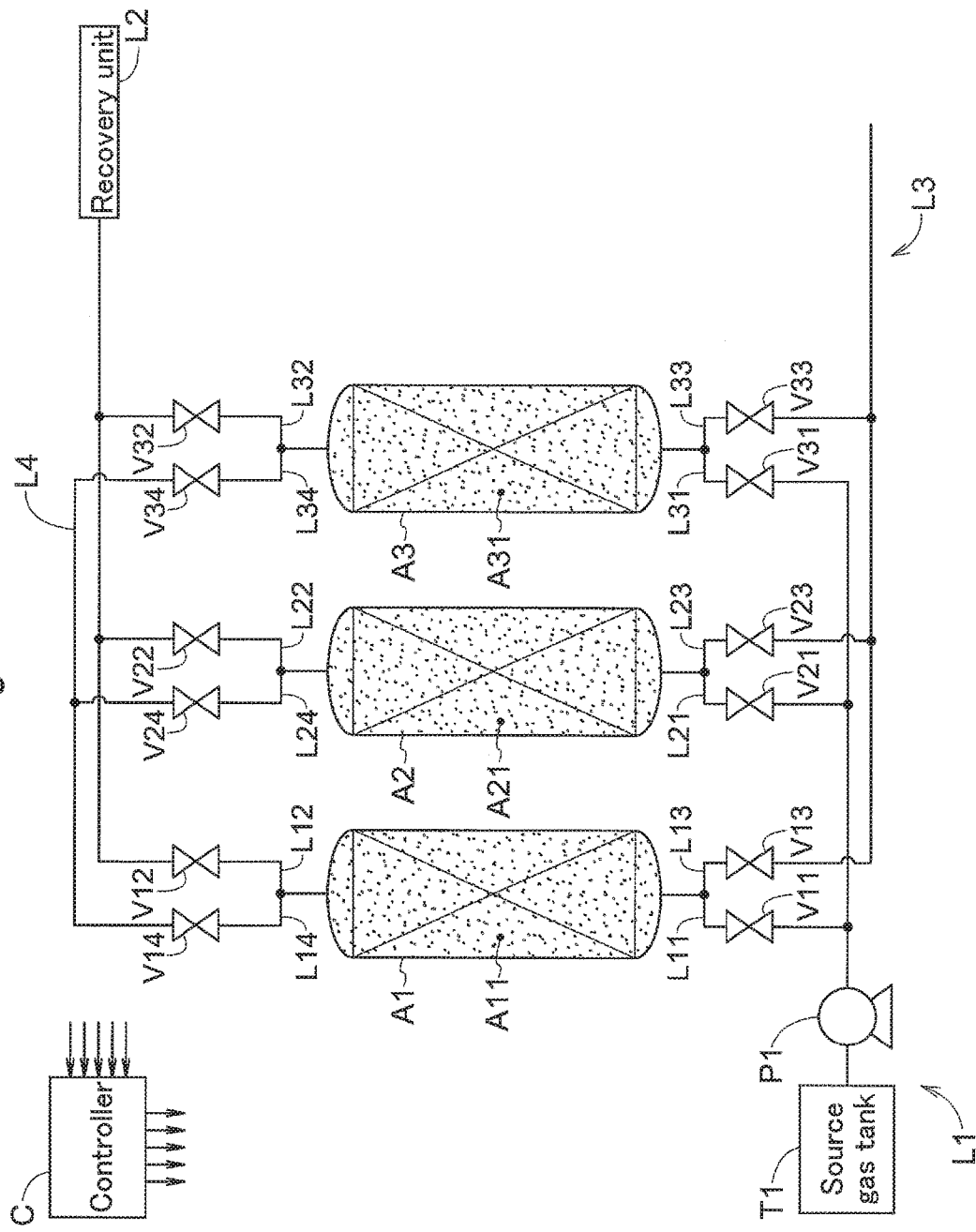

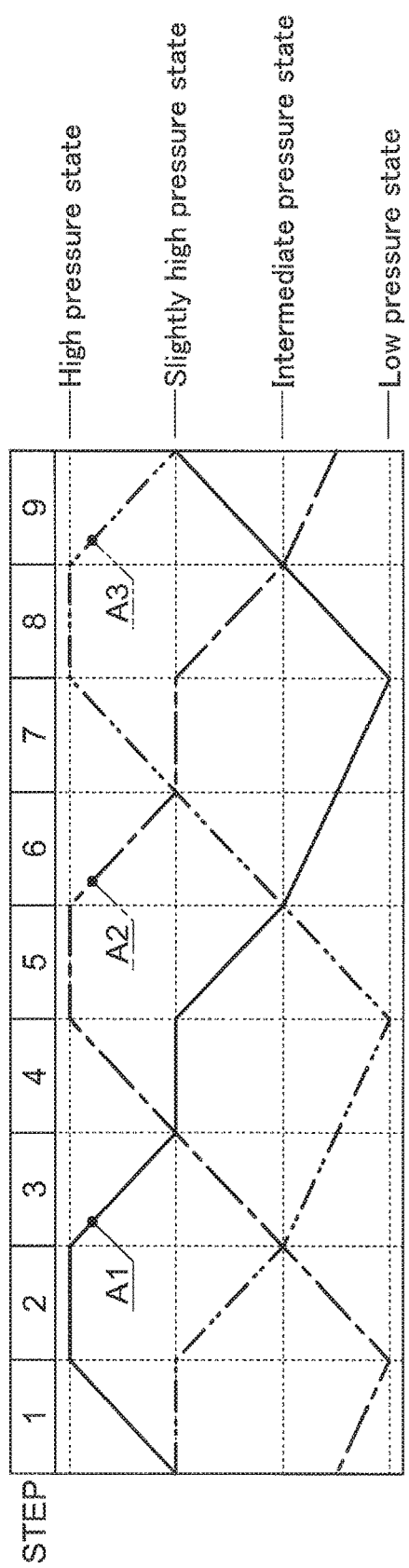

GAS CONCENTRATION METHOD

CROSS-REFERENCE TO RELATED APPLICATIONS

This application is the United States national phase of International Application No. PCT/JP2015/068534 filed Jun. 26, 2015, and claims priority to Japanese Patent Application No. 2014-133150 filed Jun. 27, 2014, the disclosures of which are hereby incorporated in their entirety by reference.

TECHNICAL FIELD

The present invention relates to a gas concentration method including:
providing three or more adsorption towers each filled with an adsorbent that adsorbs an adsorption target gas; and
performing, for each of the adsorption towers, a PSA (Pressure Swing Adsorption) cycle of repeating in order:
an adsorption process of receiving supply of a source gas containing the adsorption target gas from a lower portion of an adsorption tower, adsorbing the adsorption target gas on an adsorbent, and releasing a non-adsorbed gas composed mainly of a non-adsorbed component from an upper portion of the adsorption tower;
a pressure equalization (pressure lowering) process of transferring the gas in the adsorption tower in which the adsorption process has been finished and which is in a high pressure state to another adsorption tower that is in a lower pressure state so as to bring the inside of the adsorption tower into an intermediate pressure state;
a decompression process of, after the pressure in the adsorption tower has been lowered by the pressure equalization (pressure lowering) process, further decompressing the adsorbent into a low pressure state so as to desorb the adsorption target gas adsorbed on the adsorbent, and recovering the adsorption target gas from the lower portion of the adsorption tower: and
a pressure equalization (pressure increasing) process of, after finishing the decompression process, receiving the gas from another adsorption tower that is in a higher pressure state so as to bring the inside of the adsorption tower into an intermediate pressure state, the PSA cycle being performed successively for the three or more adsorption towers with shifted timing.

BACKGROUND ART

In the case of effectively using a flammable gas, it is necessary to separate a gas such as air from a source gas containing the flammable gas, and concentrate the flammable gas to an appropriate concentration range. Various such apparatuses and methods for concentrating a flammable gas have been proposed, and inventions have been proposed in which a gas (so-called coal mine gas) generating from a coal mine in the form of a methane-containing gas is used as a source gas, air (mainly containing nitrogen, oxygen, and carbon dioxide) is separated from the source gas by using an adsorbent, and methane is concentrated for use (Patent Document 1, for example).

More specifically, Patent Document 1 proposes an invention of an apparatus and a method for concentrating methane. According to the invention, with the use of natural zeolite, which has a very slower adsorption rate for methane than for nitrogen, as an adsorbent (i.e., with the use of an adsorbent that preferentially adsorbs miscellaneous gases such as nitrogen, oxygen, and carbon dioxide to methane), coal mine gas is introduced into an adsorption tower filled with the adsorbent by a compressor or the like until a predetermined pressure is reached. Then, the miscellaneous gases that are contained in the coal mine gas are adsorbed first at the front portion (lower portion) of the adsorption tower, and methane, for which the adsorption rate is slow, is adsorbed at the back portion (upper portion) of the adsorption tower. Further, the methane is released from the upper portion of the adsorption tower until it reaches atmospheric pressure.

Thereby, the air can be separated from the coal mine gas as the source gas by using the adsorbent, the methane can be concentrated, and the concentrated methane can be used as a fuel or the like.

That is, as the PSA cycle, a configuration is conceivable that is provided with a control means for successively performing an adsorption process of supplying the source gas to the adsorption tower, adsorbing the miscellaneous gases on the adsorbent in the adsorption tower, and releasing methane, and a desorption process of desorbing the miscellaneous gases from the adsorbent in the adsorption tower so as to regenerate the adsorbent in the adsorption tower.

With regard to such a PSA cycle, it is desired to perform a pressure equalization process of transferring the gas in an adsorption tower in which the adsorption process has been finished and which is in the high pressure state into another adsorption tower that is in a lower pressure state so as to bring the inside of the adsorption tower into an intermediate pressure state, and a pressure equalization process of receiving, after finishing the decompression process, the gas from another adsorption tower that is in a higher pressure state so as to bring the inside of the adsorption tower into an intermediate pressure state, thereby improving the efficiency of the energy required for pressure increase and pressure lowering in the adsorption towers, and also improving the recovery rate of a gas to be purified, while improving the purity of the gas to be purified.

Note that in the present invention, of a pair of adsorption towers between which the pressure equalization process is performed, the pressure equalization process performed in the adsorption tower whose internal pressure is lowered by transferring the gas to the other tower is referred to as the pressure equalization (pressure lowering) process, and the pressure equalization process performed in the adsorption tower whose internal pressure is increased by receiving the gas from the other tower is referred to as the pressure equalization (pressure increasing) process.

PRIOR ART DOCUMENTS

Patent Documents

Patent Document 1: JP S58-198591A

DISCLOSURE OF THE INVENTION

Problem to be Solved by the Invention

Therefore, in view of the above-described situations, the inventors' object is to perform a pressure equalization process in an appropriate manner when gas concentration is performed through PSA using three or more adsorption towers, thereby making it possible to improve the efficiency of energy required for pressure increase and pressure lowering in the adsorption towers and, furthermore, improving the recovery rate of a gas to be purified, while improving the purity of the gas to be purified.

Means for Solving Problem

A characteristic feature of a gas concentration method of the present invention for attaining the above-described object lies in a gas concentration method including:

providing three or more adsorption towers each filled with an adsorbent that adsorbs an adsorption target gas; and performing, for each of the adsorption towers, a PSA cycle of repeating in order:

an adsorption process of receiving supply of a source gas containing the adsorption target gas from a lower portion of the adsorption tower, adsorbing the adsorption target gas on the adsorbent, and releasing a non-adsorbed gas composed mainly of a non-adsorbed component from an upper portion of the adsorption tower;

a pressure equalization (pressure lowering) process of transferring the gas in the adsorption tower in which the adsorption process has been finished and which is in a high pressure state to another adsorption tower that is in a lower pressure state so as to bring the inside of the adsorption tower into an intermediate pressure state;

a decompression process of, after the pressure in the adsorption tower has been lowered by the pressure equalization (pressure lowering) process, further decompressing the adsorbent into a low pressure state so as to desorb the adsorption target gas adsorbed on the adsorbent, and recovering said adsorption target gas from the lower portion of the adsorption tower; and a pressure equalization (pressure increasing) process of, after finishing the decompression process, receiving the gas from the inside of another adsorption tower that is in a higher pressure state so as to bring the inside of the adsorption tower into an intermediate pressure state, the PSA cycle being successively performed for the three or more adsorption towers with shifted timing, wherein the method comprises a step of, prior to performing the pressure equalization (pressure lowering) process in a first adsorption tower in which the adsorption process has been finished, and in a source gas supply state in which the source gas is supplied to at least a second adsorption tower in which the pressure equalization (pressure increasing) process has been finished and the adsorption process is to be subsequently performed, transferring the non-adsorbed gas from the upper portion of the first adsorption tower to the upper portion of the second adsorption tower, thereby performing an adsorption and pressure equalization (pressure lowering) process in the first adsorption tower and an adsorption and pressure equalization (pressure increasing) process in the second adsorption tower.

Since the above-described configuration includes a basic configuration of a gas concentration method that uses the aforementioned conventional gas concentration apparatus, it is possible to concentrate a flammable gas or the like by performing a PSA cycle of supplying a source gas containing the flammable gas or the like into an adsorption tower, adsorbing an adsorption target gas on an adsorbent in the adsorption tower, and successively performing the adsorption process and a desorption process.

Conventionally, a configuration has been conceived in which, when a pressure equalization process is adopted in such a PSA cycle, the pressure equalization process is performed at a step in which the adsorption process or the desorption process is performed in any one of the adsorption towers, the pressure equalization process being performed between a pair of adsorption towers, such as the adsorption tower immediately after the adsorption process and the adsorption tower immediately after the desorption process, with respect to which it is preferable to increase and lower the internal pressures of the respective adsorption towers in advance, prior to the start of the subsequent process. It is considered that this process makes it possible to reduce the power required for performing the PSA cycle, by equalizing the internal pressures of the respective adsorption towers by increasing or lowering the internal pressures while effectively recycling the non-adsorbed gas by using the differential pressure between the adsorption towers.

However, although it is desirable to perform such a pressure equalization process a plurality of times in the case where a large number of adsorption towers are provided, it has been considered that when, for example, four adsorption towers are provided, the pressure equalization process can be performed a maximum of only four times per tower in a single PSA cycle. That is, while the adsorption process is performed in a first adsorption tower, the pressure equalization process can be performed only between a second adsorption tower and a fourth adsorption tower and between a third adsorption tower and the fourth adsorption tower if, at the subsequent step that comes after the completion of the adsorption process in the first adsorption tower, an adsorption tower in which the adsorption process is to be performed is the second adsorption tower and an adsorption tower in which the desorption process is to be performed is the fourth adsorption tower. Therefore, it has been considered that with respect to the first adsorption tower in which the adsorption process has been finished, the pressure equalization process can be performed only four times: one pressure equalization (pressure increasing) process and one pressure equalization (pressure lowering) process for each of the two adsorption towers, namely, the third and fourth adsorption towers other than the second adsorption tower in which the adsorption process is to be subsequently performed. Consequently, in the pressure equalization process prior to the adsorption process, the pressure in the relevant adsorption tower is increased to only a pressure lower than the pressure at which the adsorption process is to be performed.

Under such situations, the inventors of the present invention conceived a technique of performing an adsorption and pressure equalization process in which the pressure equalization process is performed simultaneously with pressure increase of the pressure in an adsorption tower. This makes it possible to adjust the PSA cycle so that, in the case of a gas concentration apparatus in which, for example, four adsorption towers are provided, the pressure equalization process can be performed six times. That is, prior to performing the pressure equalization (pressure lowering) process in a first adsorption tower in which the adsorption process has been finished, a step is provided in which, in a source gas supply state in which the source gas is supplied to at least a second adsorption tower in which the pressure equalization (pressure increasing) process has been finished and the adsorption process is to be subsequently performed, the non-adsorbed gas from the first adsorption tower is transferred via the upper portion of the first adsorption tower to the upper portion of the second adsorption tower, thereby performing the adsorption and pressure equalization (pressure lowering) process in the first adsorption tower and the adsorption and pressure equalization (pressure increasing) process in the second adsorption tower.

Thus, the non-adsorbed gas discharged from the first adsorption tower can be transferred and supplied from the first adsorption tower to the second adsorption tower, while the source gas is supplied to at least the second adsorption tower. Accordingly, pressure lowering in the first adsorption tower and pressure increase in the second adsorption tower are performed at the same time, and as a result, pressure equalization can be performed between the first adsorption tower and the second adsorption tower. Moreover, at this time, supply of the source gas to the second adsorption tower can be continuously performed without interruption, and therefore, the PSA cycle as a whole encompassing the other adsorption towers is little affected. Accordingly, without making a substantial change to the basic configuration and the operating method of a conventional gas concentration apparatus that uses a PSA cycle, it is possible to perform the pressure equalization process (the adsorption and pressure equalization (pressure lowering) process and the adsorption and pressure equalization (pressure increasing) process) between the first adsorption tower and the second adsorption tower and to thereby allow the pressure equalization process to be performed two more times (one adsorption and pressure equalization (pressure lowering) process and one adsorption and pressure equalization (pressure increasing) process) for each of the adsorption towers. In this case, the opportunities to recover the non-adsorbed gas in the adsorption towers can be increased, and thereby this can contribute to the improvement of the recovery rate at which the non-adsorbed gas is recovered. That is, increasing the number of times the pressure equalization process is performed makes it possible to lower the pressure in each adsorption tower during the decompression process to an even lower pressure. Then, during the decompression process, the amount of non-adsorbed gas that remains in the adsorption tower can also be reduced. Thus, the amount of non-adsorbed gas that is discarded together with the adsorption target gas from the inside of the adsorption tower during the decompression process will be reduced, and the recovery rate of the non-adsorbed gas can thereby be improved. Note that the non-adsorbed gas contains the gas to be purified.

Moreover, at this time, the non-adsorbed gas that is transferred and supplied from the first adsorption tower to the second adsorption tower is transferred from the upper portion of the first adsorption tower to the upper portion of the second adsorption tower, so that the non-adsorbed gas that contains relatively little impurities in the first adsorption tower at the final stage of the adsorption process can be recovered. Therefore, the recovery rate of the non-adsorbed gas will be improved efficiently. Furthermore, since the non-adsorbed gas that is recovered at this time is supplied from the upper portion of the first adsorption tower to the upper portion of the second adsorption tower, the non-adsorbed gas having a relatively high purity is supplied to the second adsorption tower, further purified by the adsorbent therein, and then can be recovered as the product gas in the subsequent adsorption process to be performed in the second adsorption tower, without being affected by the supply of the source gas to the second adsorption tower. That is, the non-adsorbed gas that is recovered from the second adsorption tower immediately after the adsorption and pressure equalization process has an increased purity, as compared with the case where a conventional configuration is adopted.

Moreover, in the first adsorption tower, after the adsorption process has been finished, pressure lowering can be efficiently started, making it possible to increase the overall number of pressure-lowering stages and to increase the period of time for which the pressure in the adsorption tower can be lowered without using power, and thus the effect of reducing the power required for pressure lowering in the adsorption towers of the gas concentration apparatus can be obtained. On the other hand, in the second adsorption tower as well, the opportunities to circulate the non-adsorbed gas containing the adsorption target gas and recover the non-adsorbed gas again while at the same time increasing the pressure in the adsorption tower will be increased, and thus, it can be considered that the gas separation performance will be improved, leading also to an improvement in the recovery rate.

Note that it is clear that the adsorption and pressure equalization process can also be adopted when a PSA cycle is performed using three towers, and further, the adsorption and pressure equalization process can also be adopted when a large number of, that is, five or more towers are used, and it is expected that the same effects as those in the case where the cycle is performed using four towers are obtained.

A further characteristic feature of the gas concentration method of the present invention is that the source gas supply state is a state in which the source gas is simultaneously supplied to both the first adsorption tower in which the adsorption process has been finished and the pressure equalization (pressure lowering) process is to be subsequently performed and the second adsorption tower in which the pressure equalization (pressure increasing) process has been finished and the adsorption process is to be subsequently performed.

It is possible to provide a step of supplying the source gas to the first adsorption tower in which the adsorption process has been finished and the pressure equalization (pressure lowering) process is to be subsequently performed and simultaneously supplying the source gas also to the second adsorption tower in which the pressure equalization (pressure increasing) process has been finished and the adsorption process is to be subsequently performed, and supplying the non-adsorbed gas from the first adsorption tower to the second adsorption tower that is in the source gas supply state, thereby performing the adsorption and pressure equalization (pressure lowering) process in the first adsorption tower and the adsorption and pressure equalization (pressure increasing) process in the second adsorption tower.

Then, the non-adsorbed gas that is discharged from the inside of the first adsorption tower after coming into contact with the adsorbent in the first adsorption tower will be transferred and supplied from the first adsorption tower to the second adsorption tower while using the supply pressure of the source gas that is supplied to the first adsorption tower and the second adsorption tower. Accordingly, while adsorption is performed in the first adsorption tower, pressure lowering in the first adsorption tower that is performed, and at the same time, pressure increase in the second adsorption tower is performed. As a result, pressure equalization can be performed between the first adsorption tower and the second adsorption tower.

Note that when the source gas is simultaneously supplied to the two towers, the source gas supply pressure per tower decreases, and thus, the source gas supply pressure becomes lower than the internal pressure of the first adsorption tower. In that case, it is assumed that the non-adsorbed gas may be transferred to the second adsorption tower from the lower portion of the first adsorption tower as well; however such situations can be avoided by appropriately setting the source gas supply pressure.

A further characteristic feature of the gas concentration method of the present invention is that the source gas supply state is a state in which while the source gas is not supplied to the first adsorption tower in which the adsorption process has been finished and the pressure equalization (pressure lowering) process is to be subsequently performed, the source gas is supplied to the second adsorption tower in which the pressure equalization (pressure increasing) process has been finished and the adsorption process is to be subsequently performed.

It is possible to provide a step of supplying the source gas to the second adsorption tower in which the pressure equalization (pressure increasing) process has been finished and the adsorption process is to be subsequently performed, with no source gas being supplied to the first adsorption tower in which the adsorption process has been finished and the pressure equalization (pressure lowering) process is to be subsequently performed, and supplying the non-adsorbed gas that is discharged from the inside of the first adsorption tower after coming into contact with the adsorbent in the first adsorption tower to the second adsorption tower that is in the source gas supply state, thereby performing the adsorption and pressure equalization (pressure lowering) process in the first adsorption tower and the adsorption and pressure equalization (pressure increasing) process in the second adsorption tower.

Then, the non-adsorbed gas that is discharged from the inside of the first adsorption tower after coming into contact with the adsorbent in the first adsorption tower is transferred and supplied to the second adsorption tower. Accordingly, the adsorption and pressure equalization (pressure lowering) process in the first adsorption tower and the adsorption and pressure equalization (pressure increasing) process in the second adsorption tower will be performed at the same time, and as a result, pressure equalization can be performed between the first adsorption tower and the second adsorption tower.

Moreover, in this case, the source gas is supplied to only the second adsorption tower, and therefore, unlike the case where pressure equalization is performed between the first adsorption tower and the second adsorption tower while simultaneously supplying the source gas to the first adsorption tower and the second adsorption tower, a situation in which the source gas supply pressure becomes lower than the internal pressure of the first adsorption tower, thereby causing the non-adsorbed gas to be transferred to the second adsorption tower from the lower portion of the first adsorption tower as well is unlikely to occur, and it is no longer necessary to give consideration to the balance between the supply pressures of the source gas supplied to the lower portions of the two adsorption towers.

In addition to the above-described configuration,
four or more of said adsorption towers may be provided,
a plurality of different pressure states of the pressure in the adsorption towers may be set as the intermediate pressure state,
the pressure equalization (pressure lowering) process may include:
  a high pressure-side pressure equalization (pressure lowering) process of transferring the gas in one of the adsorption towers that is in the high pressure state to another one of the adsorption towers that is in the intermediate pressure state at a pressure lower than the pressure of the one of the adsorption towers so as to bring the pressure in the one of the adsorption towers into a high pressure-side intermediate pressure state; and
  a low pressure-side pressure equalization (pressure lowering) process of transferring the gas in one of the adsorption towers that is in the intermediate pressure state at a pressure higher than the low pressure state to another one of the adsorption towers that is in the low pressure state so as to bring the pressure in the one of the adsorption towers into a low pressure-side intermediate pressure state,
the pressure equalization (pressure increasing) process may include:
  a low pressure-side pressure equalization (pressure increasing) process of receiving, into one of the adsorption towers that is in the low pressure state, the gas in another one of the adsorption towers that is in the high pressure-side intermediate pressure state so as to bring the pressure in the one of the adsorption towers into the low pressure-side intermediate pressure state; and
  a high pressure-side pressure equalization (pressure increasing) process of receiving, into one of the adsorption towers that is in the low pressure-side intermediate pressure state, the gas in another one of the adsorption towers that is in the high pressure state so as to bring the pressure in the one of the adsorption towers into the high pressure-side intermediate pressure state, and
the gas may be transferred from one of the adsorption towers in which the pressure equalization (pressure lowering) process is performed to another one of the adsorption towers in which the pressure equalization (pressure increasing) process is performed, the gas being transferred from the upper portion of the one of the adsorption towers to the upper portion of the other one of the adsorption tower.

That is, the above-described configuration makes it possible that, in the case where four or more adsorption towers are provided, the pressure in each adsorption tower is lowered through at least three pressure equalization states, that is, the adsorption and pressure equalization (pressure lowering) process, the high pressure-side pressure equalization (pressure lowering) process, and the low pressure-side pressure equalization (pressure lowering) process, and the pressure in each adsorption tower can be changed through at least three pressure equalization states, that is, the low pressure-side pressure equalization (pressure increasing) process, the high pressure-side pressure equalization (pressure increasing) process, and the adsorption and pressure equalization (pressure increasing) process. Consequently, the power required for pressure increase in the adsorption towers and the power required for pressure lowering in the adsorption towers can be reduced. Moreover, when an even larger number of adsorption towers are provided, an even larger number of pressure states can be set.

Furthermore, the source gas may be composed mainly of one gas selected from coal mine gas, biogas, reformed gas, and natural gas, and a gas to be purified may be methane.

When the source gas is coal mine gas, biogas, reformed gas, natural gas, or the like, and the gas to be purified is methane, methane having a higher purity can be concentrated at a higher recovery rate, and thus fuel resources can be effectively used.

Moreover, the adsorbent may contain, as a main component thereof, at least one selected from activated carbons, molecular sieve carbons, zeolites, and porous metal complexes.

The above-described adsorbent is capable of efficiently and selectively adsorbing and desorbing gases other than methane, and thus when a methane-containing gas is used as the source gas, methane concentration can be performed efficiently.

In particular, an adsorbent that is composed mainly of a material having, at a pore size of 0.38 nm or more, the pore size being determined by the MP method, a pore volume ($V_{0.38}$) of not more than 0.01 cm³/g at that pore size and having a pore volume ($V_{0.34}$) of equal to or more than 0.20 cm³/g at a pore size of 0.34 nm has especially high methane separation performance and is thereby preferable.

Effects of Invention

Accordingly, it has become possible to increase the number of times the pressure equalization process is performed when gas concentration is performed through PSA, and thereby improve the gas recovery rate even more with respect to the same target gas purity.

BRIEF DESCRIPTION OF THE DRAWINGS

FIG. 2 is a diagram showing changes in internal pressure of the adsorption towers (four towers) due to the gas concentration method.

FIG. 3 is a schematic diagram of a gas concentration apparatus (three towers) for performing the gas concentration method.

FIG. 4 is a diagram showing changes in internal pressure of the adsorption towers (three towers) due to the gas concentration method.

EMBODIMENTS OF THE INVENTION

Figure 1:
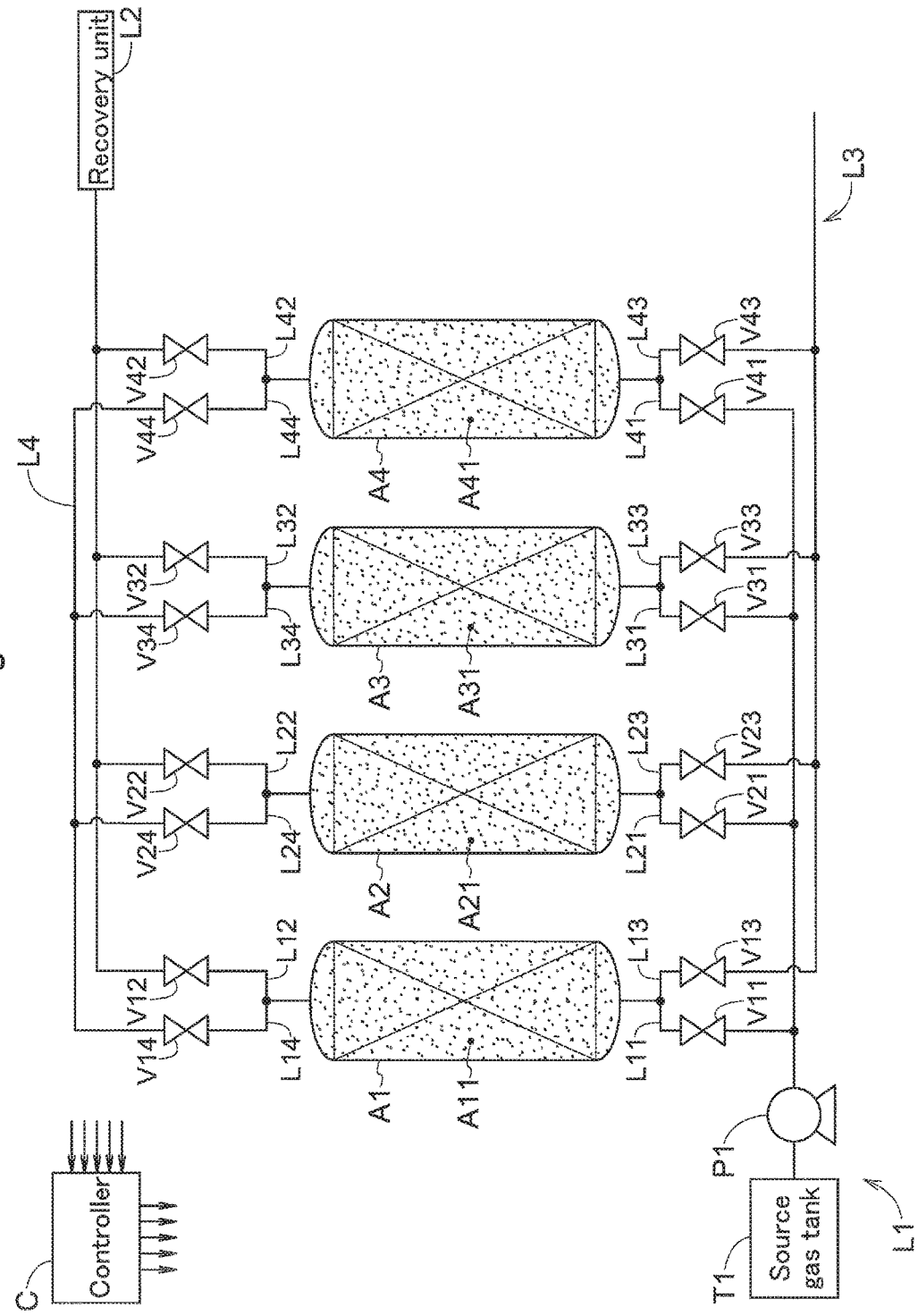
FIG. 1 is a schematic diagram of a gas concentration apparatus (four towers) for performing a gas concentration method.

Hereinafter, a gas concentration method according to embodiments of the present invention will be described. Although preferred examples will be described below, the examples are described for more specifically illustrating the present invention. Various modifications may be made without departing from the gist of the invention, and the present invention is not limited to the following description.

(Gas Concentration Apparatus)

As shown in FIG. 1, a gas concentration apparatus used for a gas concentration method of the present invention is provided with adsorption towers A1 to A4 filled with adsorbents A11 to A41, a supply unit L1 and a recovery unit L2 for supplying biogas (an example of a source gas) from a source gas tank T1 and recovering methane that has not been adsorbed on the adsorbents A11 to A41, a decompression unit L3 for decompressing and recovering miscellaneous gases other than methane that have been adsorbed on the adsorbents A11 to A41, and a controller C that controls the operations of the supply unit L1, the recovery unit L2, and the decompression unit L3.

Note that the adsorbents A11 to A41 are not limited as long as they can selectively (preferentially) adsorb miscellaneous gases, such as carbon dioxide and nitrogen, other than a flammable gas such as methane gas, but the use of adsorbents A11 to A41 capable of selectively adsorbing miscellaneous gases under atmospheric pressure and at 298 K allows miscellaneous gases to be sufficiently adsorbed on the adsorbents A11 to A41 even under atmospheric pressure and at 298 K.

It is preferable to use adsorbents A11 to A41 that are composed of at least one selected from the group consisting of molecular sieve carbons, activated carbons, zeolites, silica gels, and organometallic complexes that have, at a pore size of 0.38 nm or more, the pore size being determined by an MP method, a pore volume ($V_{0.38}$) of not more than 0.01 cm³/g at that pore size and have a pore volume ($V_{0.34}$) of equal to or more than 0.20 cm³/g at a pore size of 0.34 nm.

(Adsorption Towers)

The adsorption towers A1 to A4 are filled with the adsorbents A11 to A41, respectively. Also, gas lines L11 to L41 for supplying biogas as a source gas from the source gas tank T1 by a supply pump P1 are provided below the adsorption towers A1 to A4 to form the supply unit L1. Gas lines L12 to L42 for releasing methane that has been concentrated as a non-adsorbed gas as a result of mainly nitrogen and carbon dioxide contained in the biogas supplied to the adsorption towers A1 to A4 being adsorbed as adsorption target gases are provided above the adsorption towers A1 to A4 to form the recovery unit L2. With this configuration, the biogas is supplied from the supply unit L1 to the adsorption towers A1 to A4, and the non-adsorbed gas that has not been adsorbed on the adsorbents A11 to A41 is discharged to the recovery unit L2. Thus, the adsorption target gases can be adsorbed on the adsorbents A11 to A41 and separated from the non-adsorbed gas. Further, for the adsorption towers A1 to A4, gas lines L13 to L43 for discharging the adsorption target gases adsorbed on the adsorbents A11 to A41 are provided below the adsorption towers A1 to A4 to form the decompression unit L3. With this decompression unit L3, high-concentration adsorption target gases that have been adsorbed on the adsorbents A11 to A41 and concentrated can be collected from the biogas supplied from the supply unit L1. The decompression unit L3 is configured to collect the adsorption target gases from the adsorption towers A1 to A4 via the gas lines L13 to L43.

Furthermore, gas lines L14 to L44 for providing connection between the adsorption towers A1 to A4 are connected to the upper portions of the adsorption towers A1 to A4 to form a pressure equalization unit L4 for transferring the gas inside each of the adsorption towers A1 to A4 to another one of the adsorption towers A1 to A4, from the upper portion of each of the adsorption towers A1 to A4 to the upper portion of the other one of the adsorption towers A1 to A4.

Note that switching valves V11 to V44 are provided in the gas lines L11 to L44, thus providing a configuration that enables the controller C to perform overall control of the switching between supply, discharge, and suspension of the gas to the adsorption towers A1 to A4 by the operation of the supply pump P1.

(Methane Concentration Method)

As shown in Table 1, the controller C controls the switching valves V11 to V44 and the supply pump P1 to control the operation of the adsorption towers A1 to A4 so as to perform, with respect to the adsorption tower A1, the following processes in order:

an adsorption process of receiving supply of biogas from a lower portion of the adsorption tower A1, adsorbing gases other than methane on the adsorbent A11, and releasing a non-adsorbed gas composed mainly of methane from an upper portion of the adsorption tower A1;

an adsorption and pressure equalization (pressure lowering) process of, in a source gas supply state in which the source gas is simultaneously supplied to both the adsorption tower A1 in which the adsorption process has been finished and a pressure equalization (pressure lowering) process is to be subsequently performed and the adsorption tower A2 in which a pressure equalization (pressure increasing) process has been finished and the adsorption process is to be subsequently performed, transferring the non-adsorbed gas from the upper portion of the adsorption tower A1 to the upper portion of the adsorption tower A2 so as to bring the adsorption tower A1 into a slightly high pressure state;

a standby process;

a high pressure-side pressure equalization (pressure lowering) process of transferring the gas in the adsorption tower A1 that is in the slightly high pressure state into the other adsorption tower A3 that is in a low pressure-side intermediate pressure state at a pressure lower than that of the adsorption tower A1 so as to bring the pressure in the adsorption tower A1 into a high pressure-side intermediate pressure state;

a low pressure-side pressure equalization (pressure lowering) process of transferring the gas in the adsorption tower A1 that is in the high pressure-side intermediate pressure state, the gas having an adsorbed gas concentration that has been slightly increased with respect to that in the high pressure-side pressure equalization (pressure lowering) process, to the other adsorption tower A4 that is in a low pressure state so as to bring the pressure in the adsorption tower A1 into a low pressure-side intermediate pressure state;

a decompression process of, after the pressure in the adsorption tower has been lowered by the low pressure-side pressure equalization (pressure lowering) process, further decompressing the adsorbent A11 into a low pressure state so as to desorb the miscellaneous gases adsorbed on the adsorbent A11 and recovering the miscellaneous gases from the lower portion of the adsorption tower A1;

a low pressure-side pressure equalization (pressure increasing) process of receiving, into the adsorption tower A1 that is in the low pressure state, the gas in the adsorption tower A2 that is in the high pressure-side intermediate pressure state so as to bring the pressure in the adsorption tower A1 into the low pressure-side intermediate pressure state;

the standby process;

a high pressure-side pressure equalization (pressure increasing) process of receiving, into the adsorption tower A1 that is in the low pressure-side intermediate pressure state, the gas in the other adsorption tower A3 that is in the slightly high pressure state so as to bring the pressure in the adsorption tower A1 into the high pressure-side intermediate pressure state;

the standby process; and an adsorption and pressure equalization (pressure increasing) process, which corresponds to the adsorption and pressure equalization (pressure lowering) process, of receiving supply of the source gas and the non-adsorbed gas from the adsorption tower A4 that is in a high pressure state so as to bring the adsorption tower A1 into the slightly high pressure state. Although the same operation will also be performed for the other adsorption towers A2 to A4 in a phase (timing) shifted manner, the detailed description thereof is omitted and replaced by the description with reference to Table 1 to avoid redundancy.

In Table 1, hollow circles indicate that the corresponding switching valves V11 to V44 are open or the corresponding pump P1 is in operation.

TABLE 1

| Adsorption towers | Steps | | | | | | | |
|---|---|---|---|---|---|---|---|---|
| | 1 | 2 | 3 | 4 | 5 | 6 | 7 | 8 |
| A1 | Adsorption | Adsorption | Adsorption | Adsorption and pressure equalization (pressure lowering) | Standby | High pressure-side pressure equalization (pressure lowering) | Low pressure-side pressure equalization (pressure lowering) | Decompression |
| A2 | Standby | High pressure-side pressure equalization (pressure increasing) | Standby | Adsorption and pressure equalization (pressure increasing) | Adsorption | Adsorption | | Adsorption and pressure equalization (pressure lowering) |
| A3 | Decompression | | Low pressure-side pressure equalization (pressure increasing) | Standby | | High pressure-side pressure equalization (pressure increasing) | Standby | Adsorption and pressure equalization (pressure increasing) |
| A4 | Standby | High pressure-side pressure equalization (pressure lowering) | Low pressure-side pressure equalization (pressure lowering) | Decompression | Decompression | | Low pressure-side pressure equalization (pressure increasing) | Standby |
| V11 | ○ | ○ | ○ | ○ | | | | |
| V12 | ○ | ○ | ○ | | | | | |
| V13 | | | | | | | | ○ |
| V14 | | | | ○ | | ○ | ○ | |
| V21 | | | | ○ | ○ | ○ | ○ | ○ |
| V22 | | | | | | ○ | ○ | ○ |
| V23 | | | | | | | | |
| V24 | | ○ | | ○ | | | | ○ |
| V31 | | | | | | | | ○ |
| V32 | | | | | | | | |
| V33 | ○ | ○ | | | | | | |
| V34 | | | | ○ | | ○ | | ○ |
| V41 | | | | | | | | |
| V42 | | | | | | | | |
| V43 | | | | ○ | ○ | ○ | | |
| V44 | ○ | ○ | | | | | ○ | |

TABLE 1-continued

| Adsorption towers | Steps | | | | | | | |
|---|---|---|---|---|---|---|---|---|
| | 9 | 10 | 11 | 12 | 13 | 14 | 15 | 16 |
| A1 | Decompression | Low pressure-side pressure equalization (pressure increasing) | | Standby | | High pressure-side pressure equalization (pressure increasing) | Standby | Adsorption and pressure equalization (pressure increasing) |
| A2 | Standby | High pressure-side pressure equalization (pressure lowering) | Low pressure-side pressure equalization (pressure lowering) | Decompression | | | Low pressure-side pressure equalization (pressure increasing) | Standby |
| A3 | | Adsorption | | Adsorption and pressure equalization (pressure lowering) | Standby | High pressure-side pressure equalization (pressure lowering) | Low pressure-side pressure equalization (pressure lowering) | Decompression |
| A4 | Standby | High pressure-side pressure equalization (pressure increasing) | Standby | Adsorption and pressure equalization (pressure increasing) | | Adsorption | | Adsorption and pressure equalization (pressure lowering) |
| V11 | | | | | | | | ○ |
| V12 | | | | | | | | |
| V13 | ○ | ○ | | | | | | |
| V14 | | | ○ | | | ○ | | ○ |
| V21 | | | | | | | | |
| V22 | | | | | | | | |
| V23 | | | | ○ | ○ | ○ | | |
| V24 | | ○ | ○ | | | | ○ | |
| V31 | ○ | ○ | ○ | ○ | | | | |
| V32 | ○ | ○ | ○ | | | | | |
| V33 | | | | | | | | ○ |
| V34 | | | | ○ | | ○ | ○ | |
| V41 | | | | ○ | ○ | ○ | ○ | ○ |
| V42 | | | | | ○ | ○ | ○ | |
| V43 | | | | | | | | |
| V44 | | ○ | | ○ | | | | ○ |
| P1 | ○ | ○ | ○ | ○ | ○ | ○ | ○ | ○ |

By such a control, the changes in the internal pressures of the adsorption towers A1 to A4 transition as shown in FIG. 2.

This will be described more specifically using the adsorption tower A1 as an example: the operation is controlled in the following manner. Note that in the following description, an X-th step is abbreviated as <X>.

<1 to 3> Adsorption Process

Biogas is introduced into the first adsorption tower A1 as the source gas from the source gas tank T1. At this time, while the pressure in the first adsorption tower A1 is increased from the slightly high pressure state to the high pressure state and maintained in the high pressure state as shown in FIG. 2, gases other than methane contained in the biogas supplied from the source gas tank T1 via the switching valve V11 of the gas line L11 of the supply unit L1 are adsorbed on the adsorbent A11 of the first adsorption tower A1, and methane is discharged via the switching valve V12 of the gas line L12 of the recovery unit L2.

Note that in the present embodiment, as shown in FIG. 2, the pressure in the first adsorption tower A1 is supposed to change between the high pressure state, the slightly high pressure state, the high pressure-side intermediate pressure state, the low pressure-side intermediate pressure state, and the low pressure state in descending order of pressure.

Note that at this time, as shown in Table 1, <1, 3> the standby process and <2> the high pressure-side pressure equalization (pressure increasing) process are performed in the second adsorption tower A2.

Also, in the third adsorption tower A3, <1, 2> the decompression process and then <3> the low pressure-side pressure equalization (pressure increasing) process are performed.

Furthermore, in the fourth adsorption tower A4, <1> the standby process, and then <2> the high pressure-side pressure equalization (pressure lowering) process and <3> the low pressure-side pressure equalization (pressure lowering) process are performed.

<4> Adsorption and Pressure Equalization (Pressure Lowering) Process

In the first adsorption tower A1 in which the adsorption process has been finished, the adsorption and pressure equalization (pressure lowering) process is performed between itself and the second adsorption tower A2 in which the high pressure-side pressure equalization (pressure increasing) process has been finished and the adsorption process is to be subsequently performed. That is, in a source gas supply state in which the first adsorption tower A1 receives supply of the biogas from the source gas tank T1 via the switching valve V11 of the gas line L11 of the supply unit L1, and the second adsorption tower A2 also receives supply of the biogas from the source gas tank T1 via the switching valve V21 of the gas line L21 of the supply unit L1, any non-adsorbed gas in the first adsorption tower A1 is discharged via the switching valve V14 of the gas line L14 of the pressure equalization unit L4, and is transferred to the second adsorption tower A2 via the switching valve V24 of the gas line L24 of the equalization unit L4. Consequently, as shown in FIG. 2, pressure equalization is performed between the first adsorption tower A1 and the second adsorption tower A2 that is in the high pressure-side intermediate pressure state, and the first adsorption tower A1 transitions from the high pressure state to the slightly high pressure state.

Note that at this time, through the operation of the open/close valves and the like as shown in Table 1, the standby process is performed in the third adsorption tower A3, and the decompression process is performed in the fourth adsorption tower A4.

<5> Standby Process

Next, the first adsorption tower A1 enters the standby state, and the slightly high pressure state is maintained, while keeping a balance in time with the adsorption process, which requires the longest time. At this time, the adsorption process is performed in the second adsorption tower A2, the third adsorption tower A3 is also in the standby process, and the decompression process continues in the fourth adsorption tower A4.

<6> High Pressure-Side Pressure Equalization (Pressure Lowering) Process

In the first adsorption tower A1 in which the adsorption and pressure equalization (pressure lowering) process has been finished, the high pressure-side pressure equalization (pressure lowering) process is performed between itself and the third adsorption tower A3 in which the high pressure-side pressure equalization (pressure increasing) process is performed. That is, the non-adsorbed gas in the tower is discharged via the switching valve V14 of the gas line L14 of the pressure equalization unit L4, and is transferred to the third adsorption tower A3 via the switching valve V34 of the gas line L34 of the pressure equalization unit L4. Consequently, as shown in FIG. 2, pressure equalization is performed between the first adsorption tower A1 and the third adsorption tower A3 that is in the low pressure-side intermediate pressure state, and the first adsorption tower A1 transitions from the slightly high pressure state to the high pressure-side intermediate pressure state.

Note that at this time, through the operation of the open/close valves and the like as shown in Table 1, the adsorption process is performed in the second adsorption tower A2, and the decompression process is performed in the fourth adsorption tower A4.

<7> Low Pressure-Side Pressure Equalization (Pressure Lowering) Process

Next, in the first adsorption tower A1, the low pressure-side pressure equalization (pressure lowering) process is performed between itself and the fourth adsorption tower A4 in which the decompression process has been finished and the low pressure-side pressure equalization (pressure increasing) process is performed. That is, any non-adsorbed gas in the tower and an initially desorbed gas composed mainly of air from the adsorbent A11 are discharged via the switching valve V14 of the gas line L14 of the pressure equalization unit L4, and are transferred to the fourth adsorption tower A4 via the switching valve V44 of the gas line L44 of the pressure equalization unit L4. Consequently, as shown in FIG. 2, pressure equalization is performed between the first adsorption tower A1 and the fourth adsorption tower A4 in which the decompression process has been finished and which is in the low pressure state, and the first adsorption tower A1 transitions from the high pressure-side intermediate pressure state to the low pressure-side intermediate pressure state.

Note that at this time, through the operation of the open/close valves and the like as shown in Table 1, the adsorption process is performed in the second adsorption tower A2, and the standby process is performed in the third adsorption tower A3.

<8 to 10> Decompression Process

The first adsorption tower A1 that has reached the low pressure-side intermediate pressure state is in a state in which high-concentration miscellaneous gases are adsorbed on the adsorbent A11 in the tower, and the high-concentration adsorption target gases (miscellaneous gases) adsorbed on the adsorbent A11 are discharged by performing a decompression process of decompressing the inside of the tower from the low pressure-side intermediate pressure state to the low pressure state. That is, the adsorption target gases are collected via the switching valve V13 of the gas line L13 of the decompression unit L3. Consequently, as shown in FIG. 2, the first adsorption tower A1 transitions from the low pressure-side intermediate pressure state to the low pressure state.

Accordingly, the pressure in the first adsorption tower A1 during this decompression process can be lowered even more, and thus, during the decompression process, the amount of non-adsorbed gas that remains in the first adsorption tower A1 can be reduced. That is, the amount of non-adsorbed gas containing the gas to be purified that is discarded from the inside of the adsorption tower A1 in the decompression process will be only an extremely small amount of non-adsorbed gas that remains in the first adsorption tower A1 in the low pressure-side intermediate pressure state. Therefore, in the present embodiment, the amount of non-adsorbed gas that is discarded in the decompression process is one-fourth of that in the case where the adsorption and pressure equalization process and other pressure equalization processes are not performed at all. It can be understood that this is an extremely effective configuration in terms of the recovery rate of the non-adsorbed gas, because the amount of non-adsorbed gas that is discarded in the decompression process can be significantly reduced compared with the amount of non-adsorbed gas that would conventionally be discarded in the case where four pressure equalization processes (one high pressure-side pressure equalization (pressure increasing) process, one pressure equalization (pressure lowering) process, one low pressure-side pressure equalization (pressure increasing) process, and one pressure equalization (pressure lowering) process) are performed in a single cycle and that would be one-third of the amount of non-adsorbed gas discarded in the case where no pressure equalization process is performed.

Note that at this time, through the operation of the open/close valves and the like as shown in Table 1, in the second adsorption tower A2, <8> the adsorption and pressure equalization (pressure lowering) process is performed between itself and the third adsorption tower A3, and then, <9> the standby process is performed, followed by <10> the high pressure-side pressure equalization (pressure lowering) process.

Also, in the third adsorption tower A3, <8> the adsorption and pressure equalization (pressure increasing) process is performed, and then <9, 10> the adsorption process is performed.

Furthermore, in the fourth adsorption tower A4, <8, 9> the standby process is performed, and then <10> the high pressure-side pressure equalization (pressure increasing) process is performed.

<11> Low Pressure-Side Pressure Equalization (Pressure Increasing) Process

In the first adsorption tower A1 which has entered the low pressure state and in which the adsorbed miscellaneous gases have been released and the adsorbent A11 has been regenerated, the low pressure-side pressure equalization (pressure increasing) process is performed between itself and the second adsorption tower A2, thereby restoring the pressure in the tower and receiving the exhaust gas which has been discharged in the low pressure-side pressure equalization (pressure lowering) process in the second adsorption tower A2 and in which the methane concentration has been increased by the initially desorbed gas from the adsorbent A21. That is, the first adsorption tower A1 receives the gas in the tower discharged from the second adsorption tower A2 that is in the high pressure-side intermediate pressure state via the switching valves V14 and V24 of the gas lines L14 and L24 of the pressure equalization unit L4. Consequently, as shown in FIG. 2, the first adsorption tower A1 restores its pressure from the low pressure state to the low pressure-side intermediate pressure state.

Note that at this time, through the operation of the open/close valves and the like as shown in Table 1, the adsorption process continues in the third adsorption tower A3, and the standby process is performed in the fourth adsorption tower A4.

<12, 13> Standby Process

Next, the first adsorption tower A1 enters the standby state, and the low pressure-side intermediate pressure state is maintained.

Note that at this time, in the second adsorption tower A2, <12, 13> the decompression process is performed; in the third adsorption tower A3, <12> the adsorption and pressure equalization (pressure lowering) process is performed, and then <13> the standby process is performed; and in the fourth adsorption tower A4, <12> the adsorption and pressure equalization (pressure increasing) process is performed, and then <13> the adsorption process is performed.

<14> High Pressure-Side Pressure Equalization (Pressure Increasing) Process

In the first adsorption tower A1 that has restored its pressure to the low pressure-side intermediate pressure state, the pressure in the tower is further restored by performing the high pressure-side pressure equalization (pressure increasing) process between itself and the third adsorption tower A3 in which the adsorption and pressure equalization (pressure lowering) process has been finished and the high pressure-side pressure equalization (pressure lowering) process is performed. That is, the first adsorption tower A1 receives the gas in the tower discharged from the third adsorption tower A3 that is in the slightly high pressure state via the switching valves V14 and V34 of the gas lines L14 and L34 of the pressure equalization unit L4. Consequently, as shown in FIG. 2, the first adsorption tower A1 restores its pressure from the low pressure-side intermediate pressure state to the high pressure-side intermediate pressure state.

Note that at this time, through the operation of the open/close valves and the like as shown in Table 1, the decompression process is performed in the second adsorption tower A2, and the adsorption process is performed in the fourth adsorption tower A4.

<15> Standby Process

Next, the first adsorption tower A1 enters the standby state, and the high pressure-side intermediate pressure state is maintained, while keeping a balance in time with the adsorption process, which requires the longest time. At this time, in the second adsorption tower A2, the low pressure-side pressure equalization (pressure increasing) process is performed between itself and the third adsorption tower A3, and in the third adsorption tower A3, the low pressure-side pressure equalization (pressure lowering) process is performed. In the fourth adsorption tower A4, the adsorption process continues.

<16> Adsorption and Pressure Equalization (Pressure Increasing) Process

Next, in the first adsorption tower A1, the adsorption and pressure equalization (pressure increasing) process is performed between itself and the fourth adsorption tower A4 after the end of the adsorption process and prior to the start of the pressure equalization (pressure lowering) process. That is, in the first adsorption tower A1, the adsorption and pressure equalization (pressure increasing) process is performed in which, in a source gas supply state in which the first adsorption tower A1 receives supply of the biogas from the source gas tank T1 via the switching valve V11 of the gas line L11 of the supply unit L1, and the fourth adsorption tower A4 also receives supply of the biogas from the source gas tank T1 via the switching valve V41 of the gas line L41 of the supply unit L1, the non-adsorbed gas from the fourth adsorption tower A4 is received in the first adsorption tower A1 via the switching valves V14 and V44 of the gas lines L14 and L44 of the pressure equalization unit L4. At this time, the standby process is performed in the second adsorption tower A2, and the decompression process is performed in the third adsorption tower A3. Consequently, as shown in FIG. 2, the first adsorption tower A1 restores its pressure from the high pressure-side intermediate pressure state to the slightly high pressure state.

Due to the above-described processes, the pressures in the adsorption towers change as shown in FIG. 2. Note that although the steps in the time cycle shown are illustrated to have equal widths, the steps actually proceed with the time proportions below.

<1, 5, 9, 13> 132 seconds
<2, 6, 10, 14> 6 seconds
<3, 7, 11, 15> 6 seconds
<4, 8, 12, 16> 1 second

EXAMPLE

As described in the embodiment above, four adsorption towers A1 to A4 below were prepared, and adsorbents A11 to A41 below were filled therein. The adsorption towers A1 to A4 were connected by piping as shown in FIG. 1, thus preparing a methane concentration apparatus. To this methane concentration apparatus, a simulated biogas was supplied at 25.1 L/min, and the methane gas concentration operation shown in Table 1 and FIG. 2 was performed under the following operating conditions.

Adsorption tower: Cylindrical (inside diameter: 54 mm, volume: 5.726 L)
:Four towers
Adsorbent: Molecular sieve carbon
Molecular sieve carbon having a pore size distribution in which, at a pore size of 0.38 nm or more, a pore volume ($V_{0.38}$) at this pore size is about 0.05 cm$^3$/g, and a pore volume ($V_{0.34}$) at a pore size of 0.34 nm is 0.20 to 0.23 cm$^3$/g, the pore size distribution being determined by the MP method.

Simulated biogas: Methane 59%
:Carbon dioxide 40%
:Nitrogen 0.6%
Operating Conditions
Temperature: 55° C.
Flow velocity: 25.1 L/min
Gas adsorption pressure (gauge pressure): 0.75 MPa
Gas desorption pressure (gauge pressure): 0.1 kPa
Condition of ending the adsorption process: when 145 seconds have elapsed from the start of the adsorption process As a result, methane having a methane concentration of 98.1 vol % was obtained at 12.6 L/min as a product gas. The recovery rate ((amount of methane in product gas/amount of methane in source gas)×100) was 82.9%.

Comparative Example

To evaluate the performance of the methane concentration method of the present invention, the gas concentration operation was performed using a PSA time cycle in which the adsorption and pressure equalization (pressure increasing) process and the adsorption and pressure equalization (pressure lowering) process were not performed. Specifically, the methane concentration operation was performed using the gas concentration apparatus in FIG. 1 and a time cycle shown in Table 2. Note that in Table 2, processes denoted by the same process names as those in Table 1 are the same as those of the example above, and their description is omitted; however, the adsorption and pressure equalization (pressure increasing) process was replaced by the adsorption process, and the adsorption and pressure equalization (pressure lowering) process was replaced by the standby process.

TABLE 2

| Adsorption towers | Steps | | | | | | | |
|---|---|---|---|---|---|---|---|---|
| | 1 | 2 | 3 | 4 | 5 | 6 | 7 | 8 |
| A1 | Adsorption | | | | Standby | | High pressure-side pressure equalization (pressure lowering) | Low pressure-side pressure equalization (pressure lowering) |
| A2 | Standby | High pressure-side pressure equalization (pressure increasing) | | Standby | | | Adsorption | |
| A3 | Decompression | | | Low pressure-side pressure equalization (pressure increasing) | Standby | | High pressure-side pressure equalization (pressure increasing) | Standby |
| A4 | Standby | High pressure-side pressure equalization (pressure lowering) | Low pressure-side pressure equalization (pressure lowering) | | Decompression | | | Low pressure-side pressure equalization (pressure increasing) |
| V11 | ○ | ○ | ○ | ○ | | | | |
| V12 | ○ | ○ | ○ | ○ | | | | |
| V13 | | | | | | | | |
| V14 | | | | | | | ○ | ○ |
| V21 | | | | | ○ | ○ | ○ | ○ |
| V22 | | | | | ○ | ○ | ○ | ○ |
| V23 | | | | | | | | |
| V24 | | | | ○ | | | | |
| V31 | | | | | | | | |
| V32 | | | | | | | | |
| V33 | ○ | ○ | ○ | | | | | |
| V34 | | | | ○ | | | ○ | |
| V41 | | | | | | | | |
| V42 | | | | | | | | |
| V43 | | | | | ○ | ○ | ○ | |
| V44 | | | ○ | ○ | | | | ○ |
| P1 | ○ | ○ | ○ | ○ | ○ | ○ | ○ | ○ |

| Adsorption towers | Steps | | | | | | | |
|---|---|---|---|---|---|---|---|---|
| | 9 | 10 | 11 | 12 | 13 | 14 | 15 | 16 |
| A1 | Decompression | | | Low pressure-side pressure equalization (pressure increasing) | Standby | | High pressure-side pressure equalization (pressure increasing) | Standby |

TABLE 2-continued

| | Col1 | Col2 | Col3 | Col4 | Col5 | Col6 | Col7 | Col8 |
|---|---|---|---|---|---|---|---|---|
| A2 | Standby | High pressure-side pressure equalization (pressure lowering) | Low pressure-side pressure equalization (pressure lowering) | Decompression | | | | Low pressure-side pressure equalization (pressure increasing) |
| A3 | Adsorption | | | | Standby | High pressure-side pressure equalization (pressure lowering) | | Low pressure-side pressure equalization (pressure lowering) |
| A4 | Standby | High pressure-side pressure equalization (pressure increasing) | Standby | | | Adsorption | | |
| V11 | | | | | | | | |
| V12 | | | | | | | | |
| V13 | ○ | ○ | ○ | | | | | |
| V14 | | | | ○ | | | ○ | |
| V21 | | | | | | | | |
| V22 | | | | | | | | |
| V23 | | | | | ○ | ○ | ○ | |
| V24 | | | ○ | ○ | | | | ○ |
| V31 | ○ | ○ | ○ | ○ | | | | |
| V32 | ○ | ○ | ○ | ○ | | | | |
| V33 | | | | | | | | |
| V34 | | | | | | | ○ | ○ |
| V41 | | | | | ○ | ○ | ○ | ○ |
| V42 | | | | | ○ | ○ | ○ | ○ |
| V43 | | | | | | | | |
| V44 | | | ○ | | | | | |
| P1 | ○ | ○ | ○ | ○ | ○ | ○ | ○ | ○ |

The gas concentration was performed in the same manner as in the example above by performing this time cycle. As a result, methane having a methane concentration of 98.3 vol % was obtained at 12.1 L/min as a product gas. The recovery rate was 80.2%.

Note that in this comparative example, the specific time cycle for the adsorption towers was set as follows so as to adjust the balance between the example above and the comparative example.

<1+2, 5+6, 9+10, 13+14> 142 seconds
<3, 7, 11, 15> 6 seconds
<4, 8, 12, 16> 6 seconds Condition of ending the adsorption process: 154 seconds after the start of adsorption A comparison between the results of the example and the comparative example showed that in both of these examples, the methane concentration was performed to a methane purity of approximately 98 vol % or more, but the recovery rate of the example was 82.9%, whereas the recovery rate of the comparative example was 80.2%. Therefore, in the example, while the gas concentration to an extremely high purity was performed, the recovery rate was about 3% higher than that of the comparative example, and it became clear that an even more efficient gas concentration method was performed.

Another Embodiment

In the above-described embodiment,
in the step in which <4> the adsorption and pressure equalization (pressure lowering) process is performed in the first adsorption tower A1, the second adsorption tower A2 was brought into the source gas supply state by simultaneously supplying the source gas to both the first adsorption tower A1 in which the adsorption process has been finished and the pressure equalization (pressure lowering) process is to be subsequently performed and the second adsorption tower A2 in which the pressure equalization (pressure increasing) process has been finished and the adsorption process is to be subsequently performed;

however, it is also possible to supply the source gas to the second adsorption tower A2 in which the pressure equalization (pressure increasing) process has been finished and the adsorption process is to be subsequently performed, with no source gas being supplied to the first adsorption tower A1 in which the adsorption process has been finished and the pressure equalization (pressure lowering) process is to be subsequently performed, thereby bringing the second adsorption tower A2 into the source gas supply state.

That is, a configuration such as that described below can be adopted as the methane concentration method.

As shown in Table 3, the controller C controls the switching valves V11 to V44 and the supply pump P1 to control the operation of the adsorption towers A1 to A4 so as to perform, with respect to the adsorption tower A1, the following processes in order:

an adsorption process of receiving supply of biogas from the lower portion of the adsorption tower A1, adsorbing gases other than methane on the adsorbent A11, and releasing a non-adsorbed gas composed mainly of methane from the upper portion of the adsorption tower A1;

an adsorption and pressure equalization (pressure lowering) process of, in a source gas supply state in which the source gas is supplied to the adsorption tower A2 in which a pressure equalization (pressure increasing) process has been finished and the adsorption process is to be subsequently performed, with no source gas being supplied to the adsorption tower A1 in which the adsorption process has been finished and a pressure equalization (pressure lowering) process is to be subsequently performed, transferring the non-adsorbed gas from the upper portion of the adsorption tower A1 to the upper portion of the adsorption tower A2 so as to bring the adsorption tower A1 into a slightly high pressure state;

a standby process;

a high pressure-side pressure equalization (pressure lowering) process of transferring the gas in the adsorption tower A1 that is in the slightly high pressure state to the other adsorption tower A3 that is in a low pressure-side intermediate pressure state at a pressure lower than that of the adsorption tower A1 so as to bring the pressure in the adsorption tower A1 into a high pressure-side intermediate pressure state;

a low pressure-side pressure equalization (pressure lowering) process of transferring the gas in the adsorption tower A1 that is in the high pressure-side intermediate pressure state, the gas having an adsorbed gas concentration that has been slightly increased with respect to that in the high pressure-side pressure equalization (pressure lowering) process, to the other adsorption tower A4 that is in a low pressure state so as to bring the pressure in the adsorption tower A1 into a low pressure-side intermediate pressure state;

a decompression process of, after the pressure in the tower has been lowered by the low pressure-side pressure equalization (pressure lowering) process, further decompressing the adsorbent A11 into a low pressure state to desorb miscellaneous gases adsorbed on the adsorbent A11 and recovering the miscellaneous gases from the lower portion of the adsorption tower A1;

a low pressure-side pressure equalization (pressure increasing) process of receiving, into the adsorption tower A1 that is in the low pressure state, the gas in the adsorption tower A2 that is in the high pressure-side intermediate pressure state so as to bring the pressure in the adsorption tower A1 into the low pressure-side intermediate pressure state;

the standby process;

a high pressure-side pressure equalization (pressure increasing) process of receiving, into the adsorption tower A1 that is in the low pressure-side intermediate pressure state, the gas in the other adsorption tower A3 that is in the slightly high pressure state so as to bring the pressure in the adsorption tower A1 into the high pressure-side intermediate pressure state;

the standby process; and an adsorption and pressure equalization (pressure increasing) process, which corresponds to the adsorption and pressure equalization (pressure lowering) process, of receiving supply of the source gas and the non-adsorbed gas from the adsorption tower A4 that is in the high pressure state so as to bring the adsorption tower A1 from the high pressure-side intermediate pressure state into the slightly high pressure state. Although the same operation will also be performed for the other adsorption towers A2 to A4 in a phase (timing) shifted manner, the detailed description thereof is omitted and replaced by the description with reference to Table 3 to avoid redundancy.

In Table 3, hollow circles indicate that the corresponding switching valves V11 to V44 are open or the corresponding supply pump P1 is in operation.

TABLE 3

| Adsorption towers | Steps | | | | | | | |
|---|---|---|---|---|---|---|---|---|
| | 1 | 2 | 3 | 4 | 5 | 6 | 7 | 8 |
| A1 | Adsorption | | | Adsorption and pressure equalization (pressure lowering) | Standby | High pressure-side pressure equalization (pressure lowering) | Low pressure-side pressure equalization (pressure lowering) | Decompression |
| A2 | Standby | High pressure-side pressure equalization (pressure increasing) | Standby | Adsorption and pressure equalization (pressure increasing) | | Adsorption | | Adsorption and pressure equalization (pressure lowering) |
| A3 | Decompression | Low pressure-side pressure equalization (pressure increasing) | | Standby | | High pressure-side pressure equalization (pressure increasing) | Standby | Adsorption and pressure equalization (pressure increasing) |
| A4 | Standby | High pressure-side pressure equalization (pressure lowering) | Low pressure-side pressure equalization (pressure lowering) | Decompression | | | Low pressure-side pressure equalization (pressure increasing) | Standby |
| V11 | ○ | ○ | ○ | | | | | |
| V12 | ○ | ○ | ○ | | | | | |
| V13 | | | | | | | | ○ |
| V14 | | | | ○ | | ○ | ○ | |
| V21 | | | | ○ | ○ | ○ | ○ | |
| V22 | | | | | ○ | ○ | ○ | |
| V23 | | | | | | | | |
| V24 | | ○ | | ○ | | | | ○ |
| V31 | | | | | | | | ○ |
| V32 | | | | | | | | |
| V33 | ○ | ○ | | | | | | |

TABLE 3-continued

| | | | | | | | | |
|---|---|---|---|---|---|---|---|---|
| V34 | | ○ | | | ○ | | ○ | |
| V41 | | | | | | | | |
| V42 | | | | | | | | |
| V43 | | | ○ | ○ | ○ | | | |
| V44 | ○ | ○ | | | | ○ | | |
| P1 | ○ | ○ | ○ | ○ | ○ | ○ | ○ | ○ |

| Adsorption towers | Steps | | | | | | | |
|---|---|---|---|---|---|---|---|---|
| | 9 | 10 | 11 | 12 | 13 | 14 | 15 | 16 |
| A1 | Decompression | Low pressure-side pressure equalization (pressure increasing) | Standby | | High pressure-side pressure equalization (pressure increasing) | Standby | Adsorption and pressure equalization (pressure increasing) | |
| A2 | Standby | High pressure-side pressure equalization (pressure lowering) | Low pressure-side pressure equalization (pressure lowering) | Decompression | | | Low pressure-side pressure equalization (pressure increasing) | Standby |
| A3 | | Adsorption | | Adsorption and pressure equalization (pressure lowering) | Standby | High pressure-side pressure equalization (pressure lowering) | Low pressure-side pressure equalization (pressure lowering) | Decompression |
| A4 | Standby | High pressure-side pressure equalization (pressure increasing) | Standby | Adsorption and pressure equalization (pressure increasing) | Adsorption | | | Adsorption and pressure equalization (pressure lowering) |
| V11 | | | | | | | | ○ |
| V12 | | | | | | | | |
| V13 | ○ | ○ | | | | | | |
| V14 | | | ○ | | | ○ | | ○ |
| V21 | | | | | | | | |
| V22 | | | | | | | | |
| V23 | | | | ○ | ○ | ○ | | |
| V24 | | ○ | ○ | | | | ○ | |
| V31 | ○ | ○ | ○ | | | | | |
| V32 | ○ | ○ | ○ | | | | | |
| V33 | | | | | | | | ○ |
| V34 | | | | ○ | | ○ | ○ | |
| V41 | | | | ○ | ○ | ○ | ○ | |
| V42 | | | | | ○ | ○ | ○ | |
| V43 | | | | | | | | |
| V44 | | ○ | | ○ | | | | ○ |
| P1 | ○ | ○ | ○ | ○ | ○ | ○ | ○ | ○ |

By such a control, the changes in the internal pressures of the adsorption towers A1 to A4 transition in the same manner as shown in FIG. 2 of the above-described embodiment, although the absolute values of pressure are slightly different.

This will be more specifically described below using the adsorption tower A1 as an example: in the fourth and sixteenth steps, the operation is controlled in the following manner.

<4> Adsorption and Pressure Equalization (Pressure Lowering) Process

In the first adsorption tower A1 in which the adsorption process has been finished and the pressure equalization (pressure lowering) process is to be subsequently performed, the adsorption and pressure equalization (pressure lowering) process is performed between itself and the second adsorption tower A2 in which the high pressure-side pressure equalization (pressure increasing) process has been finished and the adsorption process is to be subsequently performed. That is, in a source gas supply state in which while the first adsorption tower A1 does not receive the biogas from the source gas tank T1, the second adsorption tower A2 receives supply of the biogas from the source gas tank T1 via the switching valve V21 of the gas line L21 of the supply unit L1, any non-adsorbed gas in the first adsorption tower A1 is discharged via the switching valve V14 of the gas line L14 of the pressure equalization unit L4, and is transferred to the second adsorption tower A2 via the switching valve V24 of the gas line L24 of the pressure equalization unit L4. Consequently, as shown in FIG. 2, pressure equalization is performed between the first adsorption tower A1 and the second adsorption tower A2 that is in the high pressure-side intermediate pressure state, and the first adsorption tower A1 transitions from the high pressure state to the slightly high pressure state.

Note that at this time, through the operation of the open/close valves and the like as shown in Table 3, the standby process is performed in the third adsorption tower A3, and the decompression process is performed in the fourth adsorption tower A4.

<16> Adsorption and Pressure Equalization (Pressure Increasing) Process

Next, in the first adsorption tower A1 in which the high pressure-side pressure equalization (pressure increasing) process has been finished and the adsorption process is to be subsequently performed, the adsorption and pressure equalization (pressure increasing) process is performed between itself and the fourth adsorption tower A4 in which the adsorption process has been finished and the high pressure-side pressure equalization (pressure lowering) process is to be subsequently performed. That is, in a source gas supply state in which while the fourth adsorption tower A4 does not receive supply of the biogas from the source gas tank T1, the first adsorption tower A1 receives the biogas from the source gas tank T1 via the switching valve V11 of the gas line L11 of the supply unit L1, any non-adsorbed gas in the fourth adsorption tower A4 is discharged via the switching valves V14 and V44 of the gas lines L14 and L44 of the pressure equalization unit L4, and is transferred to the first adsorption tower A1 via the switching valve V44 of the gas line L44 of the pressure equalization unit L4. Consequently, as shown in FIG. 2, pressure equalization is performed between the first adsorption tower A1 and the fourth adsorption tower A4 that is in the high pressure state, and the first adsorption tower A1 transitions from the high pressure-side intermediate pressure state to the slightly high pressure state. At this time, the standby process is performed in the second adsorption tower A2, and the decompression process is performed in the third adsorption tower A3.

Another Example

The gas concentration was performed in the same manner as in the example above by performing this time cycle. As a result, methane having a methane concentration of 98.2 vol % was obtained at 12.3 L/min as a product gas. The recovery rate was 81.7%.

A comparison between the results of the other example and the comparative example showed that in both of these examples, the methane concentration was performed to a methane purity of approximately 98 vol % or more, but the recovery rate of the other example was 81.7%, whereas the recovery rate of the comparative example was 80.2%. Therefore, in the other example, while the gas concentration to an extremely high purity was performed, the recovery rate was about 2% higher than that of the comparative example, and it became clear that an efficient gas concentration method was performed as in the case of the example above (recovery rate: 82.9%).

Another Embodiment 2

In both of the above-described embodiments, the present invention has been described using an example in which four adsorption towers are used; however, the same gas concentration method of the present application can also be performed when three adsorption towers are used (FIG. 3). Note that in FIG. 3, those portions that have the same configurations or functions as the configurations in FIG. 1 are denoted by the same reference numerals, and their detailed description is thereby omitted. Moreover, the same gas concentration method of the present application can also be performed when five or more towers are used, but a description of such configurations is omitted because it is obvious from the configuration examples in which three or four towers are used.

Specifically, as shown in Table 4, the switching valves V11 to V34 and the supply pump P1 are controlled to control the operation of the adsorption towers A1 to A3 so as to perform, with respect to the adsorption tower A1, the following processes in order:

an adsorption process of receiving supply of a source gas from the lower portion of the adsorption tower A1, adsorbing gases other than methane on the adsorbent A11, and releasing a non-adsorbed gas composed mainly of methane from the upper portion of the adsorption tower A1;

an adsorption and pressure equalization (pressure lowering) process of, prior to performing a pressure equalization (pressure lowering) process in the first adsorption tower A1 in which the adsorption process has been finished, supplying the source gas to at least the second adsorption tower A2 in which a pressure equalization (pressure increasing) process has been finished and the adsorption process is to be subsequently performed, and transferring the non-adsorbed gas from the upper portion of the first adsorption tower A1 to the upper portion of the second adsorption tower A2 so as to bring the adsorption tower A1 into a slightly high pressure state, where although the second adsorption tower A2 in this process is in the source gas supply state, the first adsorption tower A1 may be or may not be in the source gas supply state (indicated by hollow triangles in Table 4);

a standby process;

a pressure equalization (pressure lowering) process of transferring the gas in the adsorption tower A1 that is in the slightly high pressure state to the other adsorption tower A3 that is in a lower pressure state at a pressure lower than the pressure of the adsorption tower A1 so as to bring the pressure in the adsorption tower A1 into an intermediate pressure state;

a decompression process of, after the pressure in the adsorption tower has been lowered by the pressure equalization (pressure lowering) process, further decompressing the adsorbent A11 into a low pressure state to desorb the gases other than methane that have been adsorbed on the adsorbent A11 and recovering the gases from the lower portion of the adsorption tower A1;

a pressure equalization (pressure increasing) process of receiving, into the adsorption tower A1 that is in the low pressure state, the gas in the adsorption tower A2 that is in the intermediate pressure state so as to bring the pressure in the adsorption tower A1 into the intermediate pressure state; and an adsorption and pressure equalization (pressure increasing) process, which corresponds to the adsorption and pressure equalization (pressure lowering) process of the adsorption tower A3, of receiving supply of the source gas and the non-adsorbed gas from the adsorption tower A3 that is in the high pressure state so as to bring the adsorption tower A1 into the slightly high pressure state. The same operation can also be performed for the other adsorption towers A2 and A3 in a phase (timing) shifted manner.

Note that in the present embodiment, as shown in FIG. 4, the pressure in the first adsorption tower A1 is supposed to change between the high pressure state, the slightly high pressure state, the intermediate pressure state, and the low pressure state in descending order of pressure.

TABLE 4

| Adsorption towers | Steps | | | | | | | | |
|---|---|---|---|---|---|---|---|---|---|
| | 1 | 2 | 3 | 4 | 5 | 6 | 7 | 8 | 9 |
| A1 | Adsorption | | Adsorption and pressure equalization (pressure lowering) | Standby | Pressure equalization (pressure lowering) | Decompression | | Pressure equalization (pressure increasing) | Adsorption and pressure equalization (pressure increasing) |
| A2 | Decompression | Pressure equalization (pressure increasing) | Adsorption and pressure equalization (pressure increasing) | Adsorption | | Adsorption and pressure equalization (pressure lowering) | Standby | Pressure equalization (pressure lowering) | Decompression |
| A3 | Standby | Pressure equalization (pressure lowering) | Decompression | Pressure equalization (pressure increasing) | Adsorption and pressure equalization (pressure increasing) | Adsorption | | | Adsorption and pressure equalization (pressure lowering) |
| V11 | ○ | ○ | Δ | | | | | | ○ |
| V12 | ○ | ○ | | | | | | | |
| V13 | | | | | | ○ | ○ | | |
| V14 | | | ○ | | ○ | | | ○ | ○ |
| V21 | | | ○ | ○ | ○ | Δ | | | |
| V22 | | | | ○ | ○ | | | | |
| V23 | ○ | | | | | | | | ○ |
| V24 | | ○ | ○ | | | ○ | | ○ | |
| V31 | | | | | | ○ | ○ | ○ | Δ |
| V32 | | | | | | | ○ | ○ | |
| V33 | | | ○ | ○ | | | | | |
| V34 | | ○ | | | ○ | ○ | | | ○ |
| P1 | ○ | ○ | ○ | ○ | ○ | ○ | ○ | ○ | ○ |

(Reference Configuration)

A case was examined in which, instead of the adsorption and pressure equalization process in the above-described embodiments, only a pressure equalization process (hereinafter referred to as "supply suspension and pressure equalization process") is performed between the first adsorption tower A1 and the second adsorption tower A2, with no source gas being supplied to the first adsorption tower A1 in which the adsorption process has been finished and the pressure equalization (pressure lowering) process is to be subsequently performed, and no source gas being supplied to the second adsorption tower A2 in which the pressure equalization (pressure increasing) process has been finished and the adsorption process is to be subsequently performed.

That is, a configuration such as that described below can be adopted as the methane concentration method.

The controller C controls the switching valves V11 to V44 and the supply pump P1 as shown in Table 5 to control the operation of the adsorption towers A1 to A4 so as to perform, with respect to the adsorption tower A1, the following processes in order:

an adsorption process of receiving supply of biogas from the lower portion of the adsorption tower A1, adsorbing gases other than methane on the adsorbent A11, and releasing a non-adsorbed gas composed mainly of methane from the upper portion of the adsorption tower A1;

a supply suspension and pressure equalization (pressure lowering) process of, in a state in which no source gas is supplied to the adsorption tower A1 in which the adsorption process has been finished and a pressure equalization (pressure lowering) process is to be subsequently performed, and also no source gas is supplied to the adsorption tower A2 in which a pressure equalization (pressure increasing) process has been finished and the adsorption process is to be subsequently performed, transferring the non-adsorbed gas from the upper portion of the adsorption tower A1 to the upper portion of the adsorption tower A2 so as to bring the adsorption tower A1 into a slightly high pressure state;

a standby process;

a high pressure-side pressure equalization (pressure lowering) process of transferring the gas in the adsorption tower A1 that is in the slightly high pressure state to the other adsorption tower A3 that is in a low pressure-side intermediate pressure state at a pressure lower than the pressure in the adsorption tower A1 so as to bring the pressure in the adsorption tower A1 into a high pressure-side intermediate pressure state;

a low pressure-side pressure equalization (pressure lowering) process of transferring the gas in the adsorption tower A1 that is in the high pressure-side intermediate pressure state, the gas having an adsorbed gas concentration that has been slightly increased with respect to that in the high pressure-side pressure equalization (pressure lowering) process, to the other adsorption tower A4 that is in a low pressure state so as to bring the pressure in the adsorption tower A1 into a low pressure-side intermediate pressure state;

a decompression process of, after the pressure in the adsorption tower has been lowered by the low pressure-side pressure equalization (pressure lowering) process, further decompressing the adsorbent A11 into a low pressure state so as to desorb miscellaneous gases adsorbed on the adsorbent A11, and recovering the miscellaneous gases from the lower portion of the adsorption tower A1;

a low pressure-side pressure equalization (pressure increasing) process of receiving, into the adsorption tower A1 that is in the low pressure state, the gas in the adsorption tower A2 that is in the high pressure-side intermediate pressure state so as to bring the pressure in the adsorption tower A1 into the low pressure-side intermediate pressure state;

the standby process;

a high pressure-side pressure equalization (pressure increasing) process of receiving, into the adsorption tower A1 that is in the low pressure-side intermediate pressure state, the gas in the other adsorption tower A3 that is in the slightly high pressure state so as to bring the pressure in the adsorption tower A1 into the high pressure-side intermediate pressure state;

the standby process; and a supply suspension and pressure equalization (pressure increasing) process, which corresponds to the adsorption and pressure equalization (pressure lowering) process, of receiving supply of the gas from the adsorption tower A4 that is in the high pressure state so as to bring the adsorption tower A1 from the high pressure-side intermediate pressure state into the slightly high pressure state. Moreover, although the same operation will also be performed for the other adsorption towers A2 to A4 in a phase (timing) shifted manner, the detailed description thereof is omitted and replaced by the description with reference to Table 5 to avoid redundancy.

Note that in the reference configuration, the pressure in the first adsorption tower A1 is supposed to change between the high pressure state, the slightly high pressure state, the high pressure-side intermediate pressure state, the low pressure-side intermediate pressure state, and the low pressure state in descending order of pressure.

In Table 5, hollow circles indicate that the corresponding switching valves V11 to V44 are open or the corresponding supply pump P1 is in operation.

TABLE 5

| Adsorption towers | Steps | | | | | | | | |
|---|---|---|---|---|---|---|---|---|---|
| | 1 | 2 | 3 | 4 | 5 | 6 | 7 | 8 | 9 |
| A1 | Adsorption | | | Supply suspension and pressure equalization (pressure lowering) | Standby | High pressure-side pressure equalization (pressure lowering) | Low pressure-side pressure equalization (pressure lowering) | Decompression | |
| A2 | Standby | High pressure-side pressure equalization (pressure increasing) | Standby | Supply suspension and pressure equalization (pressure increasing) | Adsorption | | | Supply suspension and pressure equalization (pressure lowering) | Standby |
| A3 | Decompression | Low pressure-side pressure equalization (pressure increasing) | | Standby | High pressure-side pressure equalization (pressure increasing) | Standby | Supply suspension and pressure equalization (pressure increasing) | Adsorption | |
| A4 | Standby | High pressure-side pressure equalization (pressure lowering) | Low pressure-side pressure equalization (pressure lowering) | Decompression | | | Low pressure-side pressure equalization (pressure increasing) | Standby | |
| V11 | ○ | ○ | ○ | | | | | | |
| V12 | ○ | ○ | ○ | | | | | | |
| V13 | | | | | | | | ○ | ○ |
| V14 | | | | ○ | | | | | |
| V21 | | | | | | ○ | ○ | ○ | |
| V22 | | | | | | ○ | ○ | ○ | |
| V23 | | | | | | | | | |
| V24 | | ○ | | ○ | | | | ○ | |
| V31 | | | | | | | | | ○ |
| V32 | | | | | | | | | ○ |
| V33 | ○ | ○ | | | | | | | |
| V34 | | | ○ | | | | ○ | ○ | |
| V41 | | | | | | | | | |
| V42 | | | | | | | | | |
| V43 | | | | ○ | ○ | ○ | | | |
| V44 | | ○ | ○ | | | | ○ | | |
| P1 | ○ | ○ | ○ | | | ○ | ○ | ○ | ○ |

| Adsorption towers | Steps | | | | | | |
|---|---|---|---|---|---|---|---|
| | 10 | 11 | 12 | 13 | 14 | 15 | 16 |
| A1 | Decompression | Low pressure-side pressure equalization (pressure increasing) | Standby | | High pressure-side pressure equalization (pressure increasing) | Standby | Supply suspension and pressure equalization (pressure increasing) |
| A2 | | High pressure-side pressure equalization | Low pressure-side pressure equalization | Decompression | | Low pressure-side pressure equalization | Standby |

TABLE 5-continued

| | (pressure lowering) Adsorption | (pressure lowering) | Supply suspension and pressure equalization (pressure lowering) | Standby | High pressure-side pressure equalization (pressure lowering) | (pressure increasing) Low pressure-side pressure equalization (pressure lowering) | Decompression |
|---|---|---|---|---|---|---|---|
| A3 | Adsorption | | Supply suspension and pressure equalization (pressure lowering) | Standby | High pressure-side pressure equalization (pressure lowering) | Low pressure-side pressure equalization (pressure lowering) | Decompression |
| A4 | High pressure-side pressure equalization (pressure increasing) | Standby | Supply suspension and pressure equalization (pressure increasing) | Adsorption | | | Supply suspension and pressure equalization (pressure lowering) |
| V11 | | | | | | | |
| V12 | | | | | | | |
| V13 | ○ | | | | | | |
| V14 | | ○ | | | ○ | | ○ |
| V21 | | | | | | | |
| V22 | | | | | | | |
| V23 | | | ○ | ○ | ○ | | |
| V24 | ○ | ○ | | | | ○ | |
| V31 | ○ | ○ | | | | | |
| V32 | ○ | ○ | | | | | |
| V33 | | | | | | | ○ |
| V34 | | | ○ | | ○ | ○ | |
| V41 | | | | ○ | ○ | ○ | |
| V42 | | | | ○ | ○ | ○ | |
| V43 | | | | | | | |
| V44 | ○ | | ○ | | | | ○ |
| P1 | ○ | ○ | ○ | ○ | ○ | ○ | |

By such a control, the changes in the internal pressures of the adsorption towers A1 to A4 transition in the same manner as shown in FIG. 2 of the above-described embodiment, although the absolute values of pressure are slightly different.

The differences from the above-described embodiments will be more specifically described below using the adsorption tower A1 as an example: in the fourth and sixteenth steps, the operation is controlled in the following manner.

<4> Supply Suspension and Pressure Equalization (Pressure Lowering) Process

In the first adsorption tower A1 in which the adsorption process has been finished and the pressure equalization (pressure lowering) process is to be subsequently performed, the supply suspension and pressure equalization (pressure lowering) process is performed between itself and the second adsorption tower A2 in which the high pressure-side pressure equalization (pressure increasing) process has been finished and the adsorption process is to be subsequently performed. That is, in a state in which the first adsorption tower A1 does not receive supply of the biogas from the source gas tank T1, and the second adsorption tower A2 also does not receive the biogas from the source gas tank T1, the non-adsorbed gas in the first adsorption tower A1 is discharged via the switching valve V14 of the gas line L14 of the pressure equalization unit L4, and is transferred to the second adsorption tower A2 via the switching valve V24 of the gas line L24 of the pressure equalization unit L4. Consequently, as shown in FIG. 2, pressure equalization is performed between the first adsorption tower A1 and the second adsorption tower A2 that is in the high pressure-side intermediate pressure state, and the first adsorption tower A1 transitions from the high pressure state to the slightly high pressure state.

Note that at this time, through the operation of the open/close valves and the like as shown in Table 5, the standby process is performed in the third adsorption tower A3, and the decompression process is performed in the fourth adsorption tower A4.

<16> Supply Suspension and Pressure Equalization (Pressure Increasing) Process

Next, in the first adsorption tower A1 in which the high pressure-side pressure equalization (pressure increasing) process has been finished and the adsorption process is to be subsequently performed, the supply suspension and pressure equalization (pressure increasing) process is performed between itself and the fourth adsorption tower A4 in which the adsorption process has been finished and the high pressure-side pressure equalization (pressure lowering) process is to be subsequently performed. That is, in a state in which the fourth adsorption tower A4 does not receive supply of the biogas from the source gas tank T1, and the first adsorption tower A1 also does not receive the biogas from the source gas tank T1 via the switching valve V11 of the gas line L11 of the supply unit L1, the non-adsorbed gas in the fourth adsorption tower A4 is discharged via the switching valves V14 and V44 of the gas lines L14 and L44 of the pressure equalization unit L4, and is transferred to the first adsorption tower A1 via the switching valve V44 of the gas line L44 of the pressure equalization unit L4. Consequently, as shown in FIG. 2, pressure equalization is performed between the first adsorption tower A1 and the fourth adsorption tower A4 that is in the high pressure state, and the first adsorption tower A1 transitions from the high pressure-side intermediate pressure state to the slightly high pressure state. At this time, the standby process is performed in the second adsorption tower A2, and the decompression process is performed in the third adsorption tower A3.

Reference Example

The gas concentration was performed by performing this time cycle. As a result, methane having a methane concentration of 98.3 vol % was obtained at 12.3 L/min as a product gas. The recovery rate was 80.9%.

Note that in this reference example, the specific time cycle for the adsorption towers was set as follows to adjust the balance between the example above and this reference example.

<1, 5, 9, 13> 131 seconds
<2, 6, 10, 14> 6 seconds
<3, 7, 11, 15> 6 seconds
<4, 8, 12, 16> 1 second Condition of ending the adsorption process: 143 seconds after the start of adsorption A comparison between the reference example and the comparative example showed that in both of these examples, the methane concentration was performed to a methane purity of approximately 98 vol % or more, but the recovery rate of the reference example was 80.9%, whereas the recovery rate of the comparative example was 80.2%. Therefore, it became clear that in the reference example, while the gas concentration to an extremely high purity was performed, the recovery rate was able to be slightly improved, as compared with the comparative example.

INDUSTRIAL APPLICABILITY

The gas concentration method of the present invention can be used for a gas concentration apparatus for recovering a high-purity gas at a high recovery rate.

DESCRIPTION OF REFERENCE SIGNS

A1 to A4: Adsorption towers (first to fourth adsorption towers)
A11 to A41: Adsorbents
C: Controller
L1: Supply unit
L2: Recovery unit
L3: Decompression unit
L4: Pressure equalization unit
L11 to L44: Gas lines
P1: Supply pump
T1: Source gas tank
V11 to V44: Switching valves

The invention claimed is:

1. A gas concentration method comprising:
providing three or more adsorption towers each filled with an adsorbent that adsorbs an adsorption target gas; and
performing, for each of the adsorption towers, a PSA cycle of repeating in order:
an adsorption process of receiving supply of a source gas containing the adsorption target gas from a lower portion of the adsorption tower, adsorbing the adsorption target gas on the adsorbent, and releasing a non-adsorbed gas composed mainly of a non-adsorbed component from an upper portion of the adsorption tower;
a pressure lowering equalization process of transferring the gas in the adsorption tower in which the adsorption process has been finished and which is in a high pressure state to another adsorption tower that is in a lower pressure state so as to bring an inside of the adsorption tower into an intermediate pressure state;
a decompression process of, after the pressure in the adsorption tower has been lowered by the pressure lowering equalization process, further decompressing the adsorbent into a low pressure state so as to desorb the adsorption target gas adsorbed on the adsorbent, and recovering said adsorption target gas from the lower portion of the adsorption tower; and
a pressure increasing equalization process of, after finishing the decompression process, receiving the gas from an inside of another adsorption tower that is in a higher pressure state so as to bring the inside of the adsorption tower into an intermediate pressure state,
the PSA cycle being successively performed for the three or more adsorption towers with shifted timing,
wherein the method comprises a step of, prior to performing the pressure lowering equalization process in a first adsorption tower in which the adsorption process has been finished, and in a source gas supply state in which the source gas is supplied to at least a second adsorption tower in which the pressure increasing equalization process has been finished and the adsorption process is to be subsequently performed, transferring the non-adsorbed gas from the upper portion of the first adsorption tower to the upper portion of the second adsorption tower, thereby performing an adsorption and pressure lowering equalization process in the first adsorption tower and an adsorption and pressure increasing equalization process in the second adsorption tower.

2. The gas concentration method according to claim 1, wherein the source gas supply state is a state in which the source gas is simultaneously supplied to both the first adsorption tower in which the adsorption process has been finished and the pressure lowering equalization process is to be subsequently performed and the second adsorption tower in which the pressure increasing equalization process has been finished and the adsorption process is to be subsequently performed.

3. The gas concentration method according to claim 1, wherein the source gas supply state is a state in which while the source gas is not supplied to the first adsorption tower in which the adsorption process has been finished and the pressure lowering equalization process is to be subsequently performed, the source gas is supplied to the second adsorption tower in which the pressure increasing equalization process has been finished and the adsorption process is to be subsequently performed.

4. The gas concentration method according to claim 1, wherein four or more of said adsorption towers are provided,
a plurality of different pressure states of the pressure in the adsorption towers are set as the intermediate pressure state,
the pressure lowering equalization process includes:
a high pressure-side pressure lowering equalization process of transferring the gas in one of the adsorption towers that is in the high pressure state to another one of the adsorption towers that is in the intermediate pressure state at a pressure lower than the pressure of the one of the adsorption towers so as to bring the pressure in the one of the adsorption towers into a high pressure-side intermediate pressure state; and
a low pressure-side pressure lowering equalization process of transferring the gas in one of the adsorption towers that is in the intermediate pressure state at a pressure higher than the low pressure state to another one of the adsorption towers that is in the low pressure state so as to bring the pressure in the one of the adsorption towers into a low pressure-side intermediate pressure state,
the pressure increasing equalization process includes:
a low pressure-side pressure increasing equalization process of receiving, into one of the adsorption towers that is in the low pressure state, the gas in another one of the adsorption towers that is in the high pressure-side intermediate pressure state so as to bring the pressure in the one of the adsorption towers into the low pressure-side intermediate pressure state; and a high pressure-side pressure increasing equalization process of receiving, into one of the adsorption towers that is in the low pressure-side intermediate pressure state, the gas in another one of the adsorption towers that is in the high pressure state so as to bring the pressure in the one of the adsorption towers into the high pressure-side intermediate pressure state, and the gas is transferred from one of the adsorption towers in which the pressure lowering equalization process is performed to another one of the adsorption towers in which the pressure increasing equalization process is performed, the gas being transferred from the upper portion of the one of the adsorption towers to the upper portion of the other one of the adsorption tower.

5. The gas concentration method according to claim 1, wherein the source gas comprises at least one gas selected from coal mine gas, biogas, reformed gas, and natural gas, and a gas to be purified comprising methane.

6. The gas concentration method according to claim 1, wherein the adsorbent comprises at least one of activated carbons, molecular sieve carbons, zeolites, and porous metal complexes.

* * * * *